Nov. 24, 1970   JEAN-RENÉ DUFOUR   3,541,770
LAWNMOWER

Filed March 18, 1969   2 Sheets-Sheet 1

INVENTOR
Jean-René DUFOUR
BY Kenwood Ross
ATTORNEY

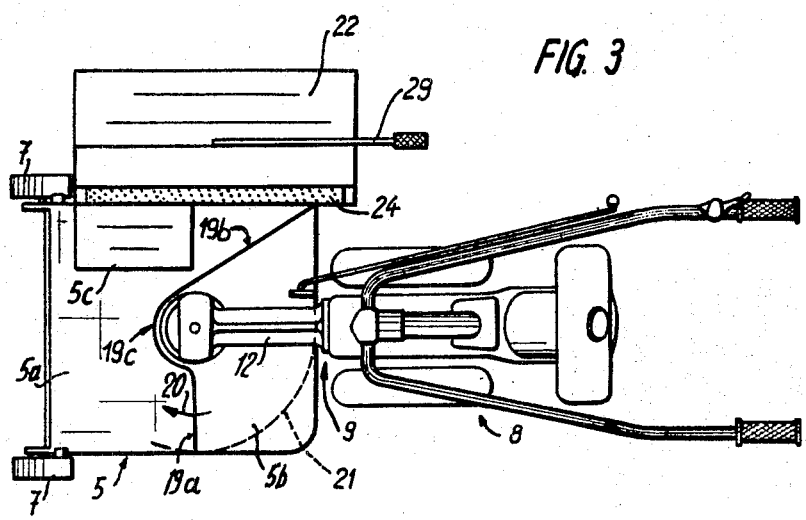
FIG. 3
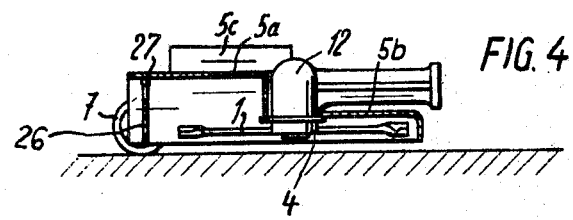
FIG. 4
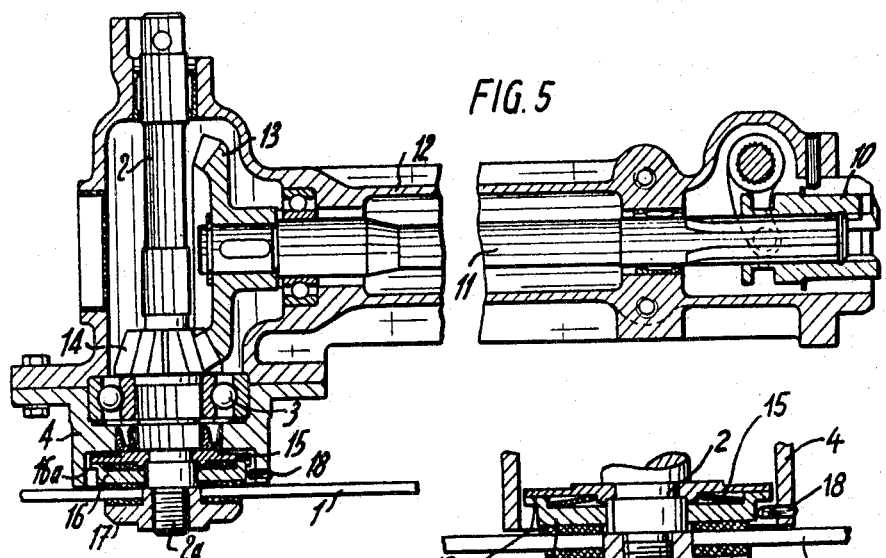
FIG. 5
FIG. 6
INVENTOR
Jean-René DUFOUR
BY Kenwood Ross
ATTORNEYS

United States Patent Office 3,541,770
Patented Nov. 24, 1970

3,541,770
LAWNMOWER
Jean-René Dufour, Plateau de Champel 18,
Geneva, Switzerland
Filed Mar. 18, 1968, Ser. No. 713,570
Claims priority, application Switzerland, Mar. 31, 1967,
4,608/67
Int. Cl. A01d 35/26
U.S. Cl. 56—25.4                                    4 Claims

ABSTRACT OF THE DISCLOSURE

A lawnmower including a rotary blade with a vertical axle revolving in a housing which is open at the bottom and is divided into a front part into which tall grass can enter and a shallower rear part. The height of the shallower part is only slightly higher than the height of the blade. Rotation of the blade through the rear part generates a horizontal air stream which ejects the grass which is cut by the blade in the front part outwardly through a lateral outlet into a grass bin.

---

The present invention relates to a lawnmower comprising a rotating blade with a vertical axle turning in a housing which is open at the bottom.

Known mowers include either a relatively tall housing, enabling the cutting of high grass which stays in place, the blade not producing, in such a housing, a current of air sufficient to evacuate the grass, or a shallow housing in which the blade forms a ventilator and creates a current of air for evacuating the cut grass. But then these mowers are not adapted to the mowing of tall grass, which clogs the housing or is laid down thereby.

It is an object of the present invention to provide a lawnmower which overcomes the above-mentioned drawbacks.

According to the invention, there is provided a lawnmower comprising a rotating blade with a vertical axle revolving in a housing open towards the bottom, the housing having a front part of which the height of the interior space is greater than that of the rear part, so that relatively tall grass may enter the housing, by a passage situated in front, and so that the blade produces by its rotation in the shallow part of the housing a current of air capable of ejecting the cut grass through an outlet in the housing.

In order that the invention may be more clearly understood, one embodiment thereof is described below with reference to the accompanying drawings, in which:

FIG. 3 shows a plan view of the same embodiment;

FIG. 4 shows a diagrammatic longitudinal section of one detail of the same embodiment and is taken on line 4—4 of FIG. 3;

FIG. 5 shows a vertical axial section of another detail of the same embodiment, on a larger scale; and FIG. 6 shows a vertical axial section of a part of the detail of FIG. 5, on a still larger scale.

Figure 1:
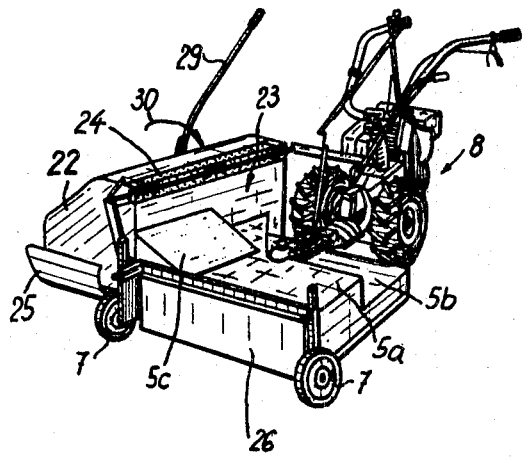
FIG. 1 shows a perspective view of one embodiment of a lawnmower according to the invention mounted on a monoaxial power driven tractor.
Figure 2:
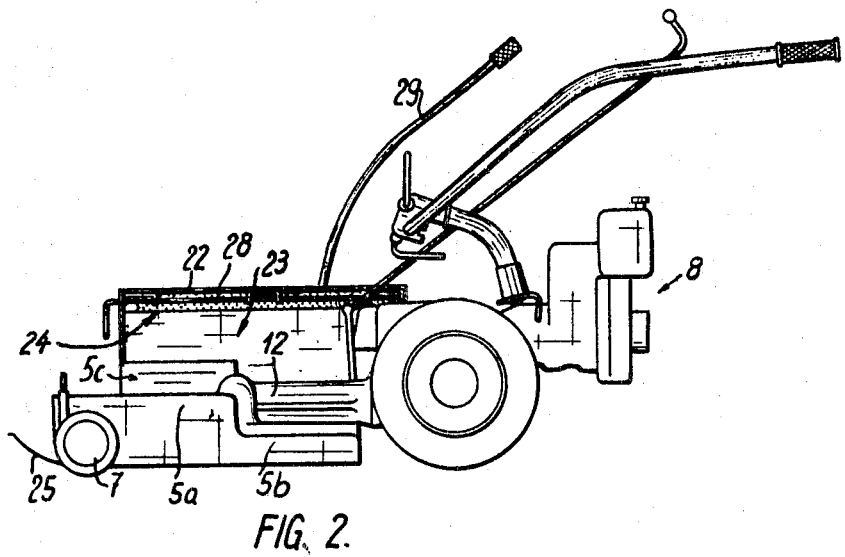
FIG. 2 shows a view in side elevation of the embodiment of FIG. 1, on a larger scale.

Referring now to the drawings, the mower shown comprises a blade 1, borne by a vertical shaft 2, turning, by means of a bearing 3, in a case 4 fixed at the centre of a housing 5 open towards the bottom. This housing bears a pair of rollers 7, located in front. The housing is fixed on the front of a power driven tractor 8 of which the power take-off (not shown) may be coupled at 9, by means of a sliding bush 10, to a horizontal shaft 11, rotatably mounted in a casing 12, and which drives the shaft 2 of the blade 1 through a pair of bevel gears 13 and 14. The blade 1 is driven frictionally by the shaft 2. To this end, a resilient disc 15, called a Belleville disc, presses axially a disc 16 against the blade, to apply it against a nut 17 screwed on the threaded end 2a of the shaft 2. The case 4 bears a radial pin 18 against which is supported the disc 16, by a shoulder 16a, when the nut 17 is unscrewed and the blade 1 dismounted, in such manner that, while being displaceable axially on the shaft 2, the disc 16, and consequently the Belleville disc 15, are prevented from being separated therefrom during the dismounting of the blade.

The housing 5 is of generally square shape; its upper face is on two levels, its front part 5a being higher than its rear part 5b. The shallower part 5b has the shape of a segment whose angle of opening is less than 180°. These two parts 5a and 5b are connected between themselves by a vertical wall comprising a first rectilinear part, designated by 19a (FIG. 3) arranged transversely with respect to the direction of movement of the mower, and a second rectilinear part, designated by 19b, directed obliquely from the centre of the housing towards the back, and which rejoins the rear right angle of the housing. The vertical wall has, at its centre, a cylindrical part 19c, connecting between themselves the parts 19a and 19b, which partially surround the casing 12 to enclose the pair of bevel gears 13 and 14 serving to drive the blade. The latter turns in the direction of the arrow 20 (FIG. 3), thus leaving the segment 5b of the housing on the right of wall part 19a of this segment.

The housing 5 has, on the inside of its part 5b, and extending slightly into its part 5a, a plate in a circular arc 21 (FIG. 3), reducing the internal volume of the part of the housing in which the blade 1 turns, so that the latter produces a current of air whose force is sufficient to eject the cut grass out of the housing which, to this end, does not have a side wall on its right.

The mower is provided with a grass bin 22, supported by the housing and located along the right lateral edge of the housing, and the height of which is greater than that of the latter, in order that its capacity may be augmented. A vertical side face 23 of this bin 22 extends above the level of the housing and is provided at the level of the latter with an opening disposed adjacent the discharge passage of the housing. The grass blown by the current of air produced by the blade is thus directly projected through said opening into the bin 22. In order to facilitate filling, the housing has a flared outlet constituted by a part 5c of its upper face, inclined upwardly, situated on the right of its front part 5a. The filling of the bin 22 is further aided by the fact that the bin has, along the upper portion of its side face and along the adjoining portion of its uppermost horizontal wall, a perforated part 24 enabling evacuation of the air blown by the blade and carrying the cut grass. The position of this perforated part, on the upper part of the bin 22 is such that there is produced on the inside of the bin, a turbulent movement of air, ensuring the complete filling of the bin. The latter is provided, in the front, with a skid 25 enabling it to slide on the ground.

It is to be noted that the front opening of the housing 5, by which the grass to be cut enters the latter, is provided with a flap 26 (FIGS. 1 and 4), which can oscillate freely forward and backward, being hinged at 27 on the housing, along a transverse axis. Thus, the air blown by the blade cannot escape from the housing through its front opening.

The grass bin 22 is hinged on the frame of the machine at 28, along a longitudinal axis around which it can turn. It bears a lever 29, accessible to the operator at the handlebar of the tractor, which enables it to be tipped intermittently in the direction of the arrow 30 (FIG. 1), to empty it. In the course of this tipping of the bin, its wall 23, normally vertical, is considerably inclined, and the cut grass contained in the bin escapes from the latter to form a heap on the ground.

Due to the fact that its housing is at two levels, the present mower enables the cutting of relatively tall grass and evacuation of the cut grass at the same time.

It is to be noted that the bin 22 may be dismounted and replaced either by a winnowing board leading the cut grass to form a swath, or by a simple scuttle, avoiding the possible throwing of stones and enabling the cut grass, particularly when the mower is used to cut a lawn already short, to be dispersed over the ground.

The present mower, instead of being mounted as the accessory to a motor tractor, could carry its own motor.

It will be apparent that various changes and modifications may be made in the embodiment described above without departing from the essential concept of the invention as defined in scope by the appended claims.

I claim:

1. In a lawnmower, the improvement including an open bottomed housing having an outlet for the discharge therefrom of cut grass, a vertical axle rotatably supported by the housing, a blade rotatably mounted on the vertical axle for rotation within the housing, the housing having a front part for permitting entrance thereinto of the grass to be cut and a relatively more shallow rear part, the shallow rear part of the housing being slightly higher than the height of the blade, with rotation of the blade through the rear part generating a draft capable of ejecting the cut grass from the front part of the housing, and with the rear part having the shape of a segment with a center coinciding with the vertical axle and having an angle of less than 180°, one side of the segment being disposed substantially transversely relative to the direction of movement of the lawnmower.

2. A lawnmower according to claim 1, including a grass bin connected to the housing for receiving the cut grass discharged through the outlet, the bin having an air exit opening defined by the top edge of the bin wall adjacent the mower and the adjacent spaced edge of the bin top wall for producing a turbulence in the bin for ensuring the filling thereof with the cut grass.

3. A lawnmower according to claim 1, with the outlet being situated along a lateral side of the housing, and with the other side of the segment being directed from its center obliquely towards the lateral side of the housing.

4. A lawnmower according to claim 1, including an intermediate friction coupling for driving the blade and including a Belleville disc pressing it against a nut which is screwed on the end of the axle, the disc acting on the blade through an intermediate disc mounted axially in a displaceable manner for exerting the pressure on the blade, abutment means preventing the disc from being separated from the casing when the screw and the blade are dismounted so that the Belleville disc and disc remain mounted on the axle.

References Cited

UNITED STATES PATENTS

| | | | |
|---|---|---|---|
| 1,880,154 | 9/1932 | Rotondo et al. | 56—25.4 |
| 2,491,544 | 12/1949 | Arkenberg | 56—25.4 |
| 2,636,333 | 4/1953 | Michaels | 56—255 |
| 2,719,396 | 10/1955 | Morris et al. | 56—25.4 |
| 2,769,295 | 11/1956 | Northcote | 56—25.4 |
| 2,818,269 | 12/1957 | Northcote et al. | 56—25.4 XR |
| 2,998,082 | 8/1961 | Arnot | 56—25.4 XR |
| 3,002,332 | 10/1961 | Shane | 56—203 |
| 3,014,330 | 12/1961 | Oberdick | 56—25.4 |
| 3,196,637 | 7/1965 | Orr | 56—25.4 XR |
| 3,201,953 | 8/1965 | Firth | 64—30 |

RUSSELL R. KINSEY, Primary Examiner

U.S. Cl. X.R.

56—202